US000002012H

(19) United States

(12) Statutory Invention Registration (10) Reg. No.: US H2012 H

Roth (43) Published: Feb. 5, 2002

(54) BRAKED JOINT ASSEMBLY

(75) Inventor: Neil A. Roth, Oswego, IL (US)

(73) Assignee: Caterpillar Inc., Peoria, IL (US)

(21) Appl. No.: 09/452,307

(22) Filed: Dec. 1, 1999

(51) Int. Cl.[7] ..... F16D 11/06

(52) U.S. Cl. ..... 403/57

(58) Field of Search ..... 403/34, 36, 37, 403/38, 39, 150, 153, 154, 155, 156, 157, 120, 367, 368, 369, 370, 57

(56) References Cited

U.S. PATENT DOCUMENTS

| | | | | | |
|---|---|---|---|---|---|
| 4,417,759 | A | | 11/1983 | Pierrot, III et al. | 294/86 R |
| 4,459,061 | A | * | 7/1984 | Klement | |
| 4,573,728 | A | * | 3/1986 | Johnson | |
| 4,609,081 | A | | 9/1986 | Hungerford | 188/307 |
| 4,679,839 | A | | 7/1987 | Damron | 294/119.4 |
| 4,717,191 | A | | 1/1988 | Farmer | 294/119.4 |
| 4,810,020 | A | * | 3/1989 | Powell | |
| 5,096,247 | A | | 3/1992 | Killen | 294/119.4 |
| 5,110,169 | A | | 5/1992 | Shepherd et al. | 294/119.4 |
| 5,385,424 | A | * | 1/1995 | Matsumoto | |
| 5,451,087 | A | * | 9/1995 | Beaulieu | |
| 5,551,794 | A | * | 9/1996 | Aare | |
| 5,601,161 | A | | 2/1997 | Brigden | 188/83 |
| 5,649,778 | A | | 7/1997 | Lin | 403/31 |
| 5,713,688 | A | * | 2/1998 | McCallum | |
| 5,730,430 | A | * | 3/1998 | Hodson et al. | |
| 5,779,383 | A | * | 7/1998 | McCallum | |

FOREIGN PATENT DOCUMENTS

| | | | |
|---|---|---|---|
| WO | WO 92/14941 | * | 2/1992 |

* cited by examiner

*Primary Examiner*—Charles T. Jordan
*Assistant Examiner*—M. Thomson
(74) *Attorney, Agent, or Firm*—Liza J. Meyers

(57) ABSTRACT

An improved braked or snubbed joint assembly for use for supporting a grapple, clam shell or like device, is disclosed. The present braked or snubbed joint assembly includes a first member including an element defining an elongate cylindrical bore therethrough having a central axis, and first and second outwardly tapered or conical convex axial end faces. A second member having first and second arms defining a space therebetween receives the first member, and an axial pin rotatably joins the first member and the second member. The second member includes an element located in the space which has a correspondingly tapered or conical concave axial end face positioned in spaced opposed relation to the first outwardly tapered or conical convex axial end face and the second arm includes an element located in the space which has a correspondingly tapered or conical concave axial end face positioned in spaced opposed relation to the second outwardly tapered or conical convex axial end face. Frictional brake elements are disposed between the opposed axial end faces for frictionally resisting or braking relative rotation of the first and second members.

15 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BRAKED JOINT ASSEMBLY

TECHNICAL FIELD

This invention relates generally to a braked joint assembly for rotatable support of a grapple mechanism, a clam shell device or the like, and more particularly, to a braked joint assembly including a load carrying bushing or bearing arrangement and a separate frictional brake arrangement utilizing opposed outwardly tapered or conical frictional brake elements for improved operability and cost aspects.

BACKGROUND ART

Grapple mechanisms, clam shells, and the like, are commonly suspended from the free or distal ends of boom assemblies of skidders, construction machines, and the like, for carrying pulpwood, logs and other heavy loads. Typically the grapple mechanisms and other load carrying elements are suspended from the boom assembly using at least one pin joint to allow relative rotational or pivotal movement in at least one plane. Such pin joints typically include snubbers or brakes for resisting or dampening the rotational or pivotal movement to limit the possibility of damage to the machine and personnel. However, the known pin joints including snubbers or brakes have been found to suffer from various operational, maintenance and cost disadvantages.

Reference in this regard, Johnson U.S. Pat. No. 4,573,728 issued Mar. 4, 1986 which utilizes a snubbing apparatus with planar frictional elements which suffers from the operational disadvantage of requiring high compression of the assembly to provide adequate snubbing torque. Reference also McCallum U.S. Pat. No. 5,713,688 issued Feb. 3, 1998 which discloses a braked mechanical joint assembly utilizing tapered or frusto-conical sections which taper inwardly, that is, convergingly toward the center of the joint for bearing both load forces and braking torques, which has been found to be unable to withstand operational loads under heavier loading conditions.

Accordingly, the present invention is directed to overcoming one or more of the problems as set forth above.

DISCLOSURE OF THE INVENTION

In one aspect of the present invention, an improved braked or snubbed joint assembly for supporting a grapple mechanism, clam shell or like device, is disclosed. The present braked or snubbed joint assembly includes a first member including an element defining an elongate cylindrical bore therethrough having a central axis, and first and second outwardly tapered or conical convex axial end faces extending around the bore. The present joint assembly includes a second member having first and second arms defining a space therebetween receiving the first member, the first arm including an element disposed in the space having a tapered concave axial end face located in spaced opposed relation to the first tapered or conical convex axial end face of the first member and the second arm including an element disposed in the space having a tapered concave axial end face located in opposed relation to the second tapered or conical convex axial end face, the arms having holes axially aligned with the bore of the first member. The present joint assembly includes a pin extending through the axially aligned holes and the bore rotatably joining the first member and the second member. Frictional brake elements are disposed respectively between the opposed tapered axial end faces for frictionally resisting or braking relative rotation of the first and second members.

Advantages of the braked or snubbed joint assembly of the present invention includes the separate performance of the load bearing and braking or snubbing functions by the elements defining the cylindrical bore of the first member, and the frictional elements, respectively. The tapered shape of the axial end faces provides a wedging effect which enables high contact forces to be generated between the tapered end faces and the brake elements for improved braking or snubbing torque. Additionally, the outwardly tapered axial end surfaces of the first member enable the element defining the cylindrical bore to be relatively long so as to be capable of carrying heavy loads and to last longer. Still further, the outwardly tapered shape enables the frictional elements to have larger surface areas of engagement so as to provide improved braking or snubbing and better dissipation of heat generated by the frictional contact.

BRIEF DESCRIPTION OF THE DRAWINGS

For a better understanding of the present invention, reference may be made to the accompanying drawings in which.

BEST MODE FOR CARRYING OUT THE INVENTION

Figure 1:
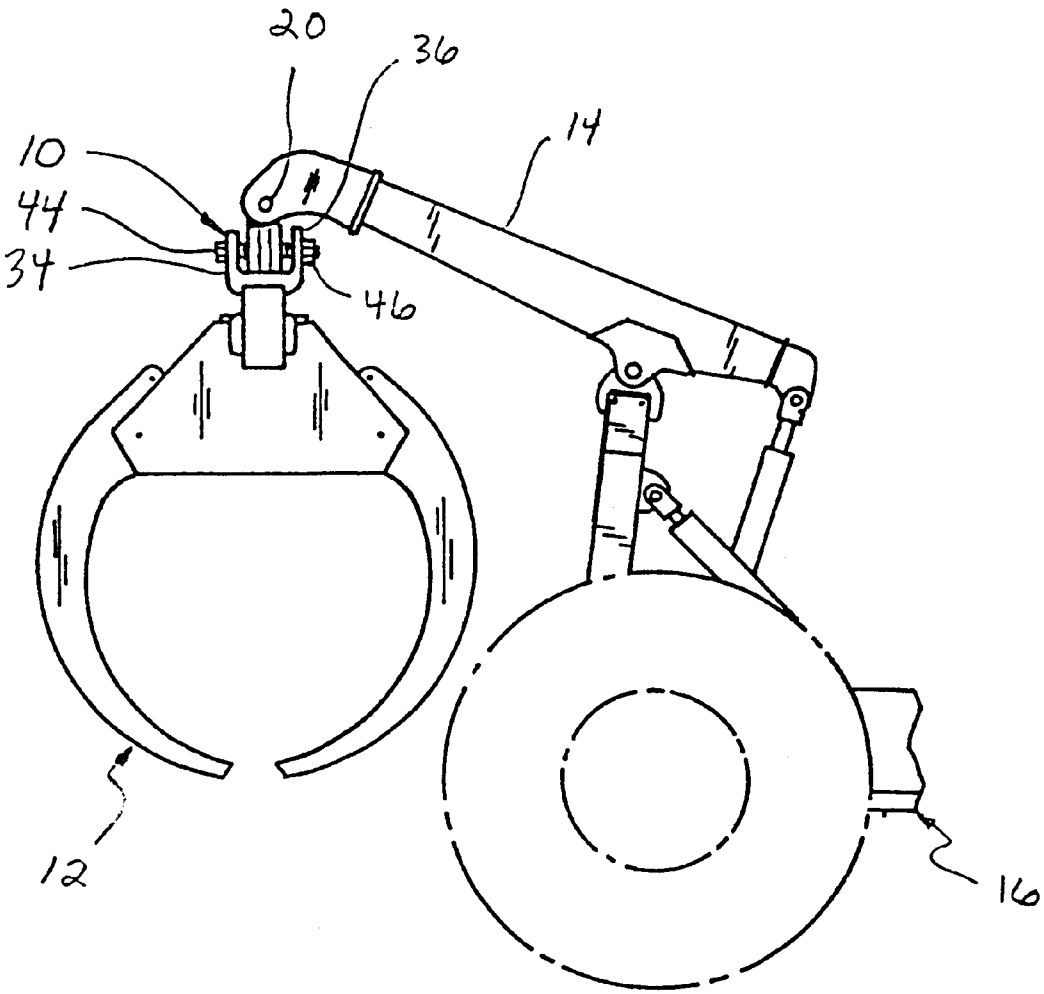
FIG. 1 is a fragmentary side elevational view illustrating a braked joint assembly of the present invention in associate with a typical grapple mechanism suspended from the free end of a boom of a work machine.
Figure 2:
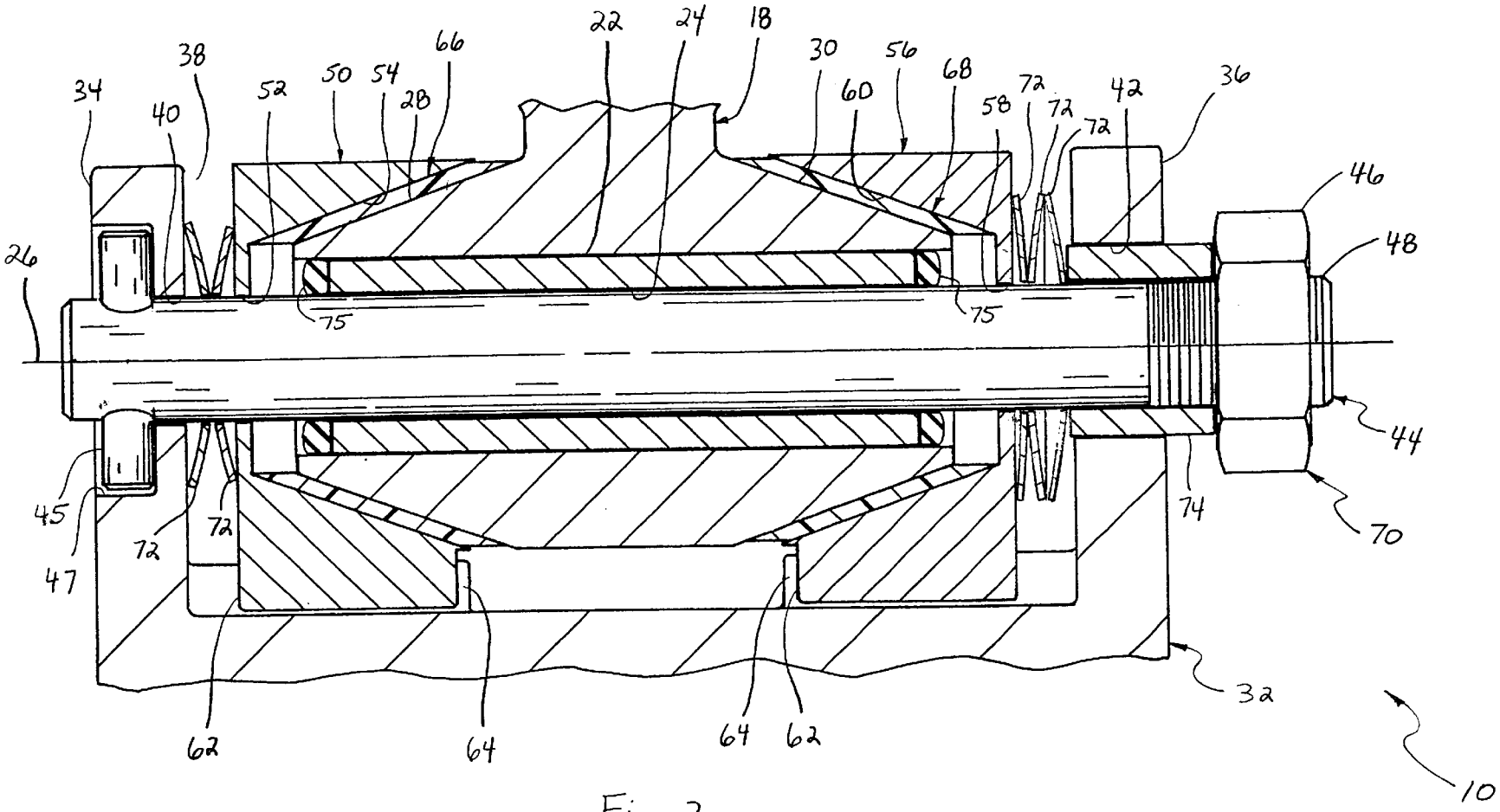
FIG. 2 is a sectional view taken through the braked joint assembly of FIG. 1.

Referring now to FIGS. 1 and 2 of the drawings, the numeral 10 denotes a braked joint assembly constructed and operable according to the teachings of the present invention, rotatably or pivotally supporting a conventional grapple mechanism 12 from a free end of a boom 14 of a work machine 16. Work machine 16 is representative of a wide variety of log skidders and other machines including a boom or other member for supporting a grapple mechanism such as mechanism 12, a clam shell, or a like device for supporting and carrying logs or other material over rough terrain such as a forest floor or the like. Here, although only one braked joint assembly 10 is shown and described which allows freedom of rotational or pivotal movement of grapple mechanism 12 about one axis, it should be understood that work machines such as work machine 16 may include one or more additional braked joint assemblies for allowing freedom of movement about an additional axis or axes. It should also be understood that although it is desired to provide relative rotational or pivotal movement of the grapple mechanism 12 or other load carrying device with respect to boom 14 and machine 16, it is also typically desired that such movement be braked or snubbed, that is, dampened to some extent, to prevent unwieldy movement of grapple mechanism 12, particularly when unloaded, such that potential damaging contact with machine 16 and injury to personnel are avoided.

Braked joint assembly 10 includes a first member 18 which is rotatably or pivotally connected to boom 14 via a pin joint 20, which can be another braked joint assembly 10, or a different pin structure. First member 18 includes a load bearing element, such as a bushing 22, which is press fit or otherwise conventionally mounted in a bore through first member 18, bushing 22 defining a cylindrical bore 24 therethrough having a central axis 26. First member 18 includes a first annular tapered convex axial end face 28 extending around one end of bore 24, and an opposite second annular tapered convex axial end face 30 extending around an opposite end of bore 24. Axial end faces 28 and 30 each taper outwardly, that is, each end face extends convergingly away from the center of member 18. This enables end faces 28 and 30 to have large surface areas to provide high braking torque, and bushing 22 to be large to provide a high load bearing capability.

Joint assembly 10 includes a second member 32 which is mounted to grapple mechanism 12, second member 32 including first and second arms 34 and 36 defining a space 38 therebetween receiving first member 18, first arm 34 being located in spaced opposed relation to first annular tapered convex axial end face 28 of first member 18 and second arm 36 being located in spaced opposed relation to second axial end face 30. Arms 34 and 36 include holes 40 and 42 therethrough, respectively, axially aligned with bore 24 of first member 18.

A pin 44 extends through axially aligned holes 40 and 42 and bore 24 to allow rotation of first member 18 relative to second member 32. Pin 44 includes a cross pin 45 cooperatively received in a transverse groove 47 in second member 32 to prevent rotation of pin 44 relative to second member 32, and pin 44 is secured in position by a nut 46 threadedly engaged with a threaded end 48 of pin 44.

Second member 32 includes a first retainer member 50 disposed in space 38 between first arm 34 and first axial end face 28 of first member 18. First retainer member 50 has a bore 52 therethrough cooperatively receiving pin 44 and a correspondingly annular tapered concave axial end face 54 positioned in spaced opposed relation to axial end face 28 of first member 18. Second member 32 includes second retainer member 56 disposed in space 38 between second arm 36 and axial end face 30 of first member 18, second retainer member 56 including a bore 58 therethrough receiving pin 44, and a corresponding annular tapered concave axial end face 60 positioned in spaced opposed relation to axial end face 30. Additionally, first and second retainer members 50 and 56 each include an outwardly projecting tab 62 received in a groove 64 of second member 32 for connecting members 50 and 56 to second member 32 or other suitable structure for allowing relative axial movement thereof but limiting relative rotation thereof.

Joint assembly 10 includes an annular tapered frictional brake element 66 disposed between axial end face 28 of first member 18 and axial end face 54 of first retainer member 50, and another annular tapered frictional brake element 68 disposed between axial end face 30 of first member 18 and axial end face 60 of second retainer member 56. Frictional brake elements 66 and 68 are each composed of a material having a relatively high coefficient of friction and a good heat dissipation property, such as, but not limited to, a semi-metallic material such as a composite of an aramid fiber and a metal or other material, a frictional polymeric material such as sold under the tradename VESPEL available from DuPont, and metallic materials such as aluminum and zinc blends and the like. Joint assembly 10 includes an element 70 for axially biasing retainer members 50 and 56 toward first member 18 for exerting a compressive force against brake elements 66 and 68 for increasing the frictional resistance to the relative rotation thereof. Here, element 70 includes a plurality of spring members 72 which are belleville washers disposed around pin 44 between arms 34 and 36 and the respective retainer members 50 and 56. Alternatively, other spring members could be used in element 70, such as wave springs or the like. Element 70 additionally includes a cylindrical sleeve 74 extending around pin 44 and extending through a hole 42 of arm 36, sleeve 74 being axially slidable along pin 44. Nut 46 is threadedly engageable with pin 44, as shown, to abut and urge sleeve 74 against the adjacent spring member 72 to resiliently compress spring members 72 to urge retainer members 50 and 56 simultaneously toward first member 18. This acts to increase the compressive pressure of engagement between brake elements 66 and 68 and the axial end faces 28, 30, 54 and 60, the pressure exerted being adjustable by threaded movement of nut 46 about pin 44.

Additionally, during use, brake elements 66 and 68 will wear resulting in the accumulation of particles of the worn frictional material in the spaces adjacent the axial ends of bushing 22. To prevent these particles, which are abrasive by their nature, from reaching and damaging the bearing surfaces of bushing 22 and pin 44, sealing rings 75 of elastomeric or other suitable construction are provided around pin 44 adjacent the ends of bushing 22.

Figure 3:
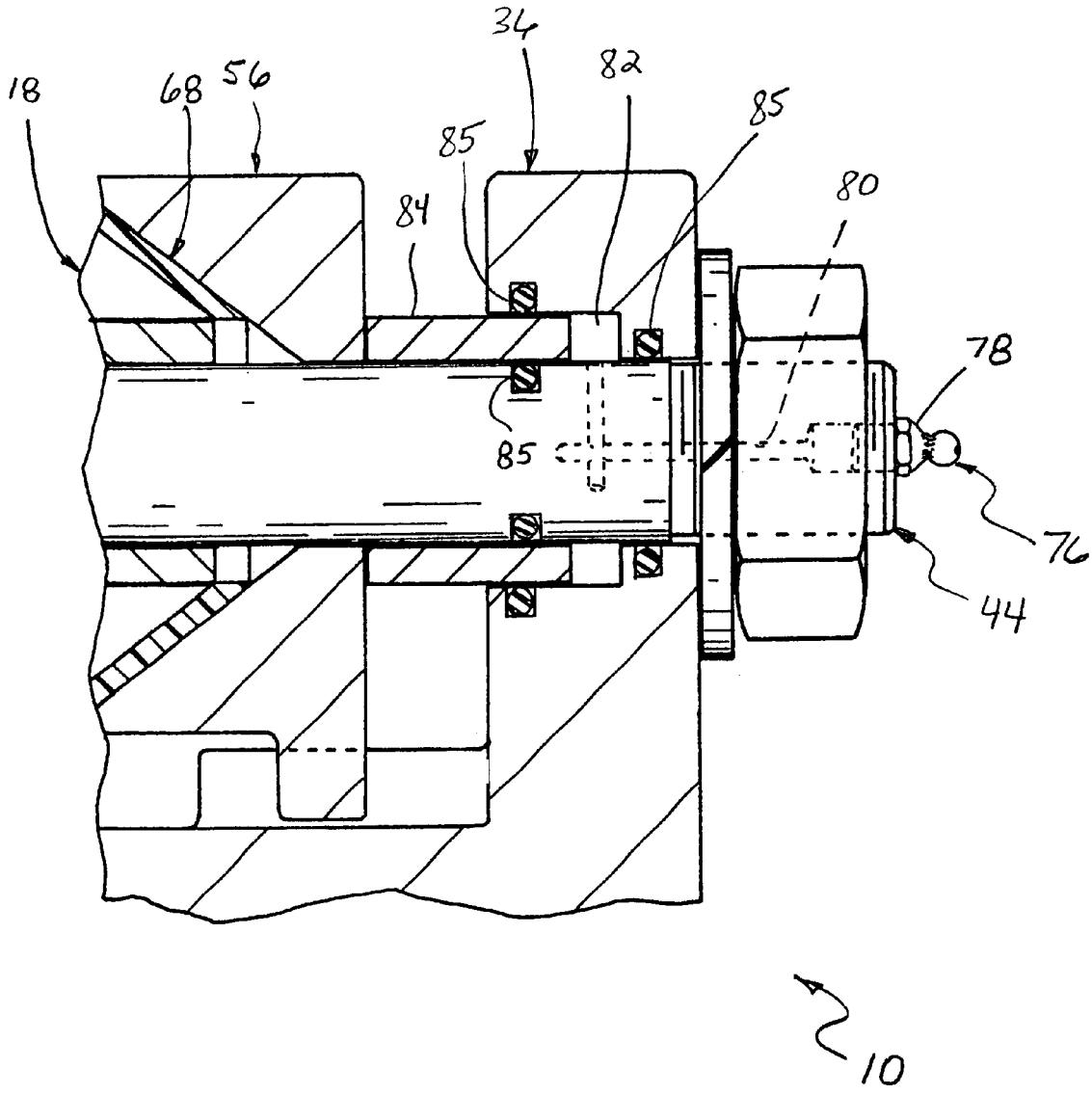
FIG. 3 is a fragmentary sectional view of an alternative braked joint assembly according to the present invention.

Referring to FIG. 3, joint assembly 10 is shown including an alternative element 76 for axially biasing retainer members 50 (FIG. 2) and 56 toward first member 18 for adjustably increasing or decreasing the frictional resistance to relative rotation of members 18 and 32. Element 76 includes a grease zirc 78 communicating through a passage 80 with a grease chamber 82 in second arm 36 around pin 44, one end of grease chamber 82 being enclosed by a cylindrical sleeve 84 extending around pin 44 in abutting relation with an axial end of second retainer member 56 modified for this purpose, chamber 82 being sealed by O-rings 85 extending around pin 44 and sleeve 84 to prevent loss of grease or other liquid under pressure within chamber 82. Grease or other suitable liquid injected into chamber 82 through zirc 78 is operable to urge sleeve 84 into contact with retainer member 56 to apply increased pressure against brake elements 66 (FIG. 2) and 68.

INDUSTRIAL APPLICABILITY

Utilizing either element 70 or element 76 for axially biasing retainer members 50 and 56 against brake elements 66 and 68, the relative rotatability of first member 18 and second member 32 via retainer members 50 and 56 can be adjustably snubbed or braked as desired.

Meanwhile, the load carried by grapple mechanism 12 is transmitted from second member 32 to first member 18 directly via pin 44 and bushing 22 without involving or loading brake elements 66 and 68, such that the load carrying and braking elements and functions are effectively separated. The load carrying bushing 22 is physically separate from the frictional brake element 66 and 68 such that heat generated by the braking or snubbing action of frictional elements 66 and 68 does not have a significant negative effect on bushing 22. The outward tapered or conical direction of the axial end faces of first member 18 and retainer members 50 and 56 enables brake elements 66 and 68 to be large in surface area such that high braking or snubbing torque can be achieved, while bushing 22 can be made as large or small as required for carrying anticipated radial and bending moment loads. In this regard, the angular orientation of end faces 28, 30, 54 and 60 can be varied from the angles shown in FIGS. 2 and 3 to enable increasing or decreasing the braking or snubbing capability of joint assembly 10, it having been found that end face angles with respect to axis 26 of between about 15 and about 45 degrees being suitable for a wide variety of applications, although other angles either larger or smaller being likewise usable.

Here, it has been found that the smaller the angle used, the greater the wedging effect or contact pressure that can be achieved by urging retainer members 50 and 56 axially toward first member 18 with a given axial force, thereby enabling high braking or snubbing torque to be achieved using smaller adjusting components such as nut 46 and sleeve 84. Use of separate brake elements and load bearing elements additionally enables replacement of one without replacement of the other to thereby provide a cost advantage.

Other aspects, objects and advantages of the present invention can be obtained from a study of the drawings, the disclosure and the appended claims.

What is claimed is:

1. A braked joint assembly, comprising:

a first member including a bushing defining an elongate cylindrical bore therethrough having a central axis, and opposite first and second outwardly tapered convex axial end faces extending around the bore;

a second member having first and second arms defining a space therebetween receiving the first member, the first arm including an element disposed in the space having a tapered concave axial end face located in opposed relation to the first outwardly tapered convex axial end face of the first member and the second arm including an element disposed in the space having a tapered concave axial end face located in opposed relation to the second outwardly tapered convex axial end face, the arms having holes axially aligned with the bore of the first member;

a pin extending through the axially aligned holes and the bore rotatably joining the first member and the second member; and frictional brake elements disposed respectively between the opposed tapered axial end faces for frictionally resisting relative rotation of the first and second members.

2. The braked joint assembly of claim 1, wherein the elements of the first and second arms of the second member having the tapered concave axial end faces comprise retainer members, the retainer members including elements cooperatively engageable with the second member to prevent relative rotation thereof.

3. The braked joint assembly of claim 2, further comprising an element axially biasing the retainer members toward the first member including spring members disposed between the arms of the second member and the retainer members, a cylindrical sleeve extending around the pin adjacent one of the spring members and extending through the hole in one of the arms, the sleeve being axially slidable along the pin, and an element for applying an axial force against the sleeve for urging the spring members into engagement with the retainer members.

4. The braked joint assembly of claim 3, wherein the element applying the axial force against the sleeve comprises a nut threadedly mounted on the pin.

5. The braked joint assembly of claim 3, wherein the element axially biasing the retainer members. toward the first member comprises a fluid.

6. The braked joint assembly of claim 3, wherein the element axially biasing the retainer members toward the first member is adjustable.

7. A braked joint assembly, comprising:

a first member including a bushing defining a cylindrical bore therethrough having a central axis, and opposite first and second outwardly tapered convex axial end faces extending around the bore;

a second member having first and second arms defining a space therebetween receiving the first member with the first arm in spaced opposed relation to the first outwardly tapered convex axial end face of the first member and the second arm in spaced opposed relation to the second outwardly tapered convex axial end face, the arms having holes axially aligned with the bore of the first member;

a pin extending through the axially aligned holes and the bore rotatably joining the first member and the second member;

a first retainer member disposed in the space between the first arm and the first tapered convex axial end face of the first member, the first retainer member having a correspondingly tapered concave axial end face positioned in spaced opposed relation to the first outwardly tapered convex axial end face, and a second retainer member disposed in the space between the second arm and the second outwardly tapered convex axial end face, the second retainer member having a correspondingly tapered concave axial end face positioned in spaced opposed relation to the second outwardly tapered convex axial end face, the first and second retainer members including elements cooperatively engageable with the second member for limiting relative axial rotation thereof;

frictional brake elements disposed respectively between the first member and the retainer members adapted for engaging the axial end faces thereof for frictionally resisting relative rotation thereof; and an element axially biasing the retainer members toward the first member for increasing the frictional resistance to the relative rotation thereof.

8. The braked joint assembly of claim 7, wherein the element axially biasing the retainer members toward the first member comprises spring members disposed around the pin between the arms of the second member and the retainer members, a cylindrical sleeve extending around the pin adjacent one of the spring members and extending through the hole in one of the arms, the sleeve being axially slidable along the pin, and an element for applying an axial force against the sleeve for urging the spring members into engagement with the retainer members.

9. The braked joint assembly of claim 8, wherein the element applying the axial force against the sleeve comprises a nut threadedly mounted on the pin.

10. The braked joint assembly of claim 7, wherein the elements cooperatively engageable with the second member comprise tabs slidably received in axial grooves of the second member.

11. The braked joint assembly of claim 7, wherein the element axially biasing the retainer members toward the first member comprises a fluid.

12. The braked joint assembly of claim 7, wherein the element axially biasing the retainer members toward the first member are adjustable.

13. A braked joint assembly, comprising:

a first member including a bushing defining an elongate cylindrical bore therethrough having a central axis, and opposite first and second tapered convex axial end faces extending around the bore;

a second member having first and second arms defining a space therebetween receiving the first member, and members disposed between the arms and the first member having tapered concave axial end faces located in opposed relation to the first and second tapered convex axial end faces of the first member, respectively, said arms and said members disposed between the arms and the first member having holes axially aligned with the bore of the first member;

a pin extending through the axially aligned holes and the bore rotatably joining the first member and the second member; and frictional brake elements disposed respectively between the opposed axial end faces for frictionally resisting relative rotation of the first and second members.

14. The braked joint assembly of claim 13, wherein the members having the tapered concave axial end faces comprise retainer members connected for rotation with the second member, at least one of the retainer members being axially movable relative to the second member for applying a compressive force against the frictional brake elements.

15. The braked joint assembly of claim 13, wherein the axial end faces are oriented at between about a 15 degree angle and about a 45 degree angle to the central axis.

* * * * *